United States Patent [19]

Houser et al.

[11] Patent Number: 5,362,432
[45] Date of Patent: Nov. 8, 1994

[54] PROCESS FOR DRY SPINNING SPANDEX

[75] Inventors: Nathan E. Houser, Afton; Willem Bakker; Richard L. Dreibelbis, both of Waynesboro, all of Va.

[73] Assignee: E. I. Du Pont de Nemours and Company, Wilmington, Del.

[21] Appl. No.: 42,342

[22] Filed: Apr. 2, 1993

[51] Int. Cl.$^5$ .......................... D01D 5/04; D01F 6/78
[52] U.S. Cl. ................................. 264/205; 264/211.12
[58] Field of Search ............................ 264/205, 211.12

[56] References Cited

U.S. PATENT DOCUMENTS

| | | | |
|---|---|---|---|
| 3,111,368 | 11/1963 | Romano | 264/205 |
| 4,973,647 | 11/1990 | Bretches et al. | 528/61 |
| 5,000,899 | 3/1991 | Dreibelbis et al. | 264/205 |

OTHER PUBLICATIONS

Translation of Japan 58-194,915 (Published Nov. 14, 1983).
Translation of Japan 3-279,415 (Published Dec. 10, 1991).

Primary Examiner—Leo B. Tentoni

[57] ABSTRACT

A process is provided for dry spinning a segmented polyurethaneurea at speeds as high as 900 meters/min. The process includes chain-extending an isocyanate-capped polyether glycol with a mixture of ethylenediamine and 1,2-diaminopropane, the 1,2-diaminopropane amounting to 8 to 17 mole % of the diamine mixture. The resultant spandex is particularly suited for use in women's hosiery.

5 Claims, No Drawings

PROCESS FOR DRY SPINNING SPANDEX

BACKGROUND OF THE INVENTION

1. Field of the Invention

The present invention relates to a method for dry-spinning spandex at high speeds. More particularly, the invention concerns such a process wherein the spandex is dry spun and wound up at speeds as high as 900 meters per minute or higher from a solution of a polyurethaneurea derived from a polyether-based glycol that was capped with diisocyanate and then chain extended with a particular mixture of specific diamines. The spandex of the invention is especially suited for use in women's hosiery.

2. Description of the Prior Art

In dry-spinning conventional spandex, the combination of properties that can be obtained in the spandex is highly dependent on spinning speed. A particular combination of elongation and setting properties is needed in spandex intended for incorporation into women's hosiery. To assure that such hosiery will have a satisfactory appearance and appropriate elastic characteristics, the maximum spinning speed at which the spandex can be produced is limited. Higher speeds are needed for more efficient and economical production. However, at higher spinning speeds, typical conventional spandex compositions have significantly poorer break elongations and setting characteristics than are desired for spandex intended for use in hosiery.

In the conventional manufacture of women's hosiery, spandex yarns usually are knit into the hosiery along with nylon yarns. After knitting, the hosiery usually is subjected to a "boarding" treatment, in which the hosiery is placed on a form and treated with steam at a temperature of about 115° C. The treatment remove wrinkles from the hosiery, sets the final shape of the hosiery, and provides the hosiery with a much more elegant initial appearance than such hosiery would have had were it not so treated.

Spandex yarns generally require higher setting temperatures than do nylon yarns. In boarding operations, excess temperatures or over-heating of the hosiery can cause formation of undesirable "board marks" or lines The undesirable marks correspond to the location of the edge of the form used in the boarding operation. Also, knit hosiery that contains spandex yarns generally does not retain the shape of the boarding form as well as does hosiery that contains no spandex, because of the strong elastic recovery properties of the spandex. These problems of spandex in hosiery are exacerbated with spandex of very low decitex. Nonetheless, over the years, the percentage of women's hosiery that contains spandex yarns has increased greatly because of the better recovery from stretch, the better fit retention and the better wear life possessed by such spandex-containing hosiery, compared to 100% nylon hosiery. Thus, there is a need for an improved spandex that can be produced at high speed and can be used satisfactorily in women's hosiery.

Though not concerned with the above-described problems of spandex in hosiery, Dreibelbis et al., U.S. Pat. No. 5,000,899, discloses a spandex that can be spun at speeds as high as 945 meters/minute. The spandex is set by a dry heat treatment at a temperature of about 190° C. Such dry heat-setting conditions are suitable for heavyweight warp-knit fabrics. However, under the milder steam heat-setting temperatures typically used for boarding lightweight hosiery fabrics, the Dreibelbis et al products have very poor set. The Dreibelbis et al spandex is a polyurethaneurea formed from an isocyanate-capped tetrahydrofuran/3-methyltetrahydrofuran copolymer glycol that was chain extended with a diamine mixture, preferably of ethylenediamine ("EDA") and 2-methylpentamethylenediamine ("MPMD"). Generally, the amount of coextender in the diamine mixture is in the range of 20 to 50 mole percent. Among possible combinations of coextenders disclosed in passing by Dreibelbis et al (i.e., at column 3, lines 35-42) is a mixture of EDA and 1,2-diaminopropane ("PDA") coextender. A similar spandex yarn, formed from a capped glycol of a copolymer of tetrahydrofuran and 3-methyltetrahydrofuran that was chain-extended with an EDA/MPMD diamine mixture, is disclosed by Bretches et al, U.S. Pat. No. 4,973,647. However, the spandex of Bretches also suffers from shortcomings similar to those of the Dreibelbis spandex.

The use of mixtures of ethylenediamine ("EDA") and 1,2-diaminopropane ("PDA") and as chain extenders for polyether-based polyurethaneureas formed into spandex is also disclosed in Japanese Patent Application Publication 3-279,415, and Japanese Patent Application Publication 58-194915. The first of these Publications discloses such spandex made with EDA/PDA mixtures containing 10-30 mol % of PDA, (only 20% is exemplified) and then spun at a maximum speed of 300 meters/minute. The second Japanese Publication discloses such spandex formed from mixtures of diols that were reacted with a diisocyanate and then chain extended with an EDA/PDA mixture containing 1-40 mol % of PDA. The resultant polymer is then spun at a maximum speed of 210 meters/minute. Neither of these Japanese publications concerns the problems encountered in boarding spandex-containing hosiery.

An objective of this invention is to provide a process for high speed spinning of a polyether-based polyurethaneurea spandex that would be particularly suited for use in women's hosiery.

SUMMARY OF THE INVENTION

The present invention provides a dry spinning process for making polyether-based polyurethaneurea spandex that is particularly suited for inclusion in women's knitted hosiery. The process comprises reacting methylene-bis(4-phenylisocyanate) with a poly(tetramethyleneether)glycol to form a capped glycol, with a capping ratio being in the range of 1.65 to 1.95 and the glycol having a number average molecular weight in the range of 1750 to 2250, chain extending the capped glycol, in an organic solvent, with a mixture of ethyenediamine and 1,2-diaminopropane, the 1,2-diaminopropane amounting to in the range of 8 to 17 mol percent of the mixture of diamine chain extenders, to form a polyurethaneurea solution, adjusting the concentration of the polyurethaneurea in the solution to be in the range of 32 to 38 weight percent of the total solution, dry-spinning said solution through orifices to form filaments of textile decitex and winding up the resultant filaments at a speed of at least 550 meters per minute, preferably at least 700 m/min, most preferably at least 850 m/min.

A novel product of the present invention is a high-speed spun spandex derived from a poly(tetramethyleneether)glycol that was capped with methylene-bis(4-phenylisocyanate) and then chain extended with a diamine mixture of ethylenediamine and 1,2-diaminopropane, the molar concentration of the 1,2-diaminopropane being in the range of 8 to 17 percent of the total diamine content of the spandex, said spandex having a break elongation of at least 450%, a tenacity of at least 0.7 deciNewtons/tex, an unload power of at least 0.13 dN/tex, an as-spun set in the range of 26 to 32% and a steam set efficiency in the range of 24 to 28%. A preferred spandex of the invention is derived from a poly(tetramethyleneether)glycol having a number average molecular weight in the range of 1750 to 1900, that was capped with methylene-bis(4 phenylisocyanate) and chain extended with a mixture of diamines having molar concentrations of ethylene diamine in the range of 85 to 90% and of 1,2-diaminopropane in the range of 15 to 10%, the spandex having a break elongation of at least 500%, a set of at least 28% and a steam set efficiency of at least 26%.

DETAILED DESCRIPTION OF PREFERRED EMBODIMENTS

The invention is further illustrated by the following description of preferred embodiments. These are included for the purposes of illustration and are not intended to limit the scope of the invention, which is defined by the appended claims.

As used herein, the term "spandex" has its usual definition; that is, a manufactured fiber in which the fiber-forming substance is a long chain synthetic polymer composed of at least 85% by weight of a segmented polyurethane. The segmented polyurethane is composed of "soft segments" and "hard segments". The soft segments are polyether-based portions of the polymer chain which, in accordance with the invention, are derived from a poly(tetramethyleneether)glycol. The hard segments are the portions of the polymer chains which are derived from methylene-bis-(4-phenylisocyanate), and the two-component chain-extending diamine mixture of the invention. "Capping ratio" is the molar ratio of diisocyanate to glycol that is used in the reaction that forms the isocyanate-capped glycol intermediate. "NCO content" refers to the isocyanate end group content of the isocyanate-capped glycol prior to the chain extension reaction with the diamine mixture. "Molecular weight" means number average molecular weight. "Fiber" includes in its meaning staple fibers and continuous filaments. "Textile decitex" means fibers 6 to 25 dtex per filament.

For convenience, in the discussion and examples which are presented hereinafter, the following abbreviations may be used for the accompanying term:

| | |
|---|---|
| poly(tetramethyleneether)glycol | PO4G |
| methylene-bis(4-phenylisocyanate), also called p,p'-methylenediphenyldiisocyanate | MDI |
| isocyanate end group | NCO |
| ethylenediamine | EDA |
| 1,2-diaminopropane, also called 1,2-propanediamine | PDA |
| 2-methyl-1,5-diaminopentane, also called 2-methyl-1,5-pentanediamine | MPMD |
| 1,2-diaminocyclohexane, also called hydrogenated o-phenylenediamine | HOPD |
| 1,3-diaminocyclohexane, also called hydrogenated m-phenylenediamine | HMPD |
| N,N-dimethylacetamide solvent | DMAc |
| tenacity, dN/tex | T |
| elongation at break, % | E |

| -continued | |
|---|---|
| unload power, dN/tex | UP |
| percent set | % S |
| steam set efficiency | SSE |

The chemical composition of spandex polymers illustrated in the examples also may be abbreviated. Monomers of the repeating units of the polymer are separated by colons. For example, a polyurethaneurea made from poly(tetramethyleneether)glycol ("PO4G"), methylene-bis(4-phenylisocyanate) ("MDI") and a mixture of ethylene diamine ("EDA") and 2-methyl-1,5-diaminopentane ("MPMD") is abbreviated PO4G:MDI:EDA/MPMD. Diamines separated by slashes (i.e., /) are in a mixture. Parenthetic numbers immediately following the glycol and diamine mixture respectively, refer to the number average molecular weight of the glycol and the molar ratio of the given diamines. Thus, for example, a polyurethaneurea made in accordance with the invention is abbreviated as:

PO4G(1800):MDI:EDA/PDA(85/15).

In accordance with the invention, the PO4G that forms the soft segment of the spandex polymer usually has a number average molecular weight in the range of 1750 to 2,250. Preferably, the PO4G has a molecular segment is derived from the THF/3-MeTHF copolymer, the 3-MeTHF content of the copolymer is in the range of 7 to 20.

To prepare a typical polyurethaneurea polymer for spandex of the invention, PO4G of the above-described molecular weight is reacted (or "capped") in a conventional manner with an excess of MDI to form an isocyanate-terminated polymer. The capping ratio (i.e., the molar ratio of MDI to glycol) is generally in the range of 1.6 to 2.0, preferably in the range of 1.7 to 1.9. Typically, the NCO content of the isocyanate-terminated polymer is in the range of 2.4 to 2.9%, preferably in the range of 2.75 to 2.85%. The capped polymer is then chain-extended with a mixture of EDA and PDA to form the polymer which is used to dry spin the spandex at high speeds. The amount of diamine chain extenders used to make polymer suitable for spandex of the invention typically be sufficient to produce hard segments that amount to 7 to 13%, preferably 9 to 11% of the total weight of the polymer. An insufficient amount of hard segment results in spandex that is overly tacky and difficult to spin. An excessive amount of hard segment detrimentally affects the elastic properties of the spandex.

Molar concentrations of the individual diamines in the diamine mixture are in the ranges of 83 to 92% EDA and 17 to 8% PDA. When the PDA concentration of the EDA/PDA mixture exceeds the desired range, as shown in Examples below, poorer properties of as-spun set and steam set efficiency are obtained in spandex dry spun at high speeds, as compared to spandex spun in the same way but made with the narrow range of diamine mixtures in accordance with the invention. When the PDA concentration in the EDA/PDA diamine mixture is below the narrow range specified in accordance with the invention, dry-spinning of the polymer solution at high speeds becomes very difficult because of undesired changes that occur in polymer solution viscosity with time. Circular knit stockings containing spandex made in accordance with the present invention avoid the problems described above which are usually encountered in "boarding" treatments of the stockings. These effects are illustrated in the Example 5 below.

Chemical reactions used to prepare polyether-based polyurethaneurea suitable for spandex of the present invention usually can be performed in conventional spandex solvent, such as dimethylacetamide, dimethylformamide, N-methylpyrrolidone or the like. The polymer solution can then be dry spun into filaments. Typically, the polymer is dry spun into filaments from the same solvent as was used for the polymerization reactions. Filaments are dry spun in accordance with the process of the invention at a windup speed of at least 550 meters per minute, preferably at least 700 m/min and most preferably at least 900 m/min. The spandex can be spun as single filaments or can be coalesced by conventional techniques into multi-filament yarns. Each filament is of textile decitex (i.e., in the range of 6 to 25 dtex per filament).

The polymer of the spandex of the invention can contain conventional agents that are added for specific purposes, such as antioxidants, thermal stabilizers, UV stabilizers, pigments, dyes, lubricating agents and the like.

Spandex yarn made in accordance with the present invention typically has a tenacity of at least 0.7 dN/tex, a break elongation of at least 450%, a fifth cycle unload power at 300% elongation of at least 0.13 dN/tex, a set of at least 25% and usually less than 33%, and a steam set efficiency of at least 24% and usually less than 28%. Such a combination of properties is unique for spandex spun at high speeds.

The following test procedures are used for measuring various characteristics of the spandex described above and in the Examples and Comparisons below.

The number average molecular weight of a polyether diol is determined from the hydroxyl number of the polyether diol, which is measured by the imidazolepyridine catalyst method described by S. L. Wellon et al, "Determination of Hydroxyl Content of Polyurethane Polyols and Other Alcohols" Analytical Chemistry, Vol 52, No 8, pp. 1374-1376 (July 1980).

The NCO content of isocyanate-capped polyether is measured by the method of S Siggia, "Quantitative Organic Analysis via Functional Group", 3rd Edition, Wiley & Sons, New York, pages 559-561 (1963).

The diamine coextender composition of the spandex polymer can be determined by the steps of (a) degrading the soft segment of the polymer in boron trifluoride etherate, (b) adding water to precipitate the hard segment, (c) filtering and drying the hard-segment precipitate, (d) dissolving the hard segment in deuterated dimethylsulfoxide and (f) analyzing the nuclear magnetic resonance spectrum to determine hydrogen bonds from which the relative amounts of EDA and MPMD can be determined.

Strength and elastic properties of the spandex are measured in accordance with the general method of ASTM D 2731-72. Three filaments, a 2-inch (5-cm) gauge length and a zero-to-300% elongation cycle are used for each of the measurements. The samples are cycled five times at an constant elongation rate of 800% per minute and then held at the 300% extension for half a minute after the fifth extension. "Unload Power" as reported herein is the stress at a extension of 300% for the fifth unload cycle and is reported in deciNewtons per tex. Percent elongation at break is measured on the sixth extension cycle. Percent set also is measured on samples that have been subjected to five 0-300% elongation/relaxation cycles. The percent set ("% S") is then calculated as $$\% S = 100(L_f - L_o)/L_o,$$

where $L_o$ and $L_f$ are respectively the filament length, when held straight without tension, before and after the five elongation/relaxation cycles.

To determine steam set efficiency, which is a measure that simulates the hosiery processing and boarding operations, a sample of given length in the straight non-tensioned condition, $Y_o$, (conveniently 10 cm) is stretched to three times its original length for about 2 minutes and then is relaxed. This simulates a covering operation in which the spandex is drafted while being covered with a conventional yarn. The thusly stretched and relaxed spandex test sample is then placed in a relaxed condition in a boiling water bath for 30 minutes. This exposure to boiling water simulates a dyeing operation. The sample is then removed from the bath, dried and stretched to twice its original relaxed length ($Y_o$). While in this stretched condition, the sample is exposed for 30 seconds to an atmosphere of steam at 10 psig (69 KPa) 110° C. The steam treatment simulates hosiery boarding. After removal from the steam atmosphere, the sample is allowed to dry, and its straight non-tensioned length, $Y_f$, is measured. Steam set is then calculated by the formula, $$SSE\% = 100(Y_f - Y_o)/Y_o.$$

The concentration of hard segment in the polymer ("%HS") is calculated by the following formula in accordance with P. J. Flory, Journal of the American Chemical Society, vol. 58, pp. 1877-1885 (1936):

$$\%HS = 100(R-1)(M_{di} + M_{da})/(M_g + RM_{di} + (R-1)M_{da})$$

wherein

M is the number average molecular weight
R is the mole ratio of isocyanate to glycol
Subscript "g" refers to glycol
Subscript "di" refers to diisocyanate and
Subscript "da" refers to the diamines (mole average molecular weight).

EXAMPLES

The following examples illustrate the invention. Spandex samples are prepared in accordance with the invention and are compared with similar spandex samples that are made with diamine mixtures and windup speeds which are outside the invention. In the examples, samples designated with Arabic numerals are samples of the invention and those designated with upper case letters are comparison samples. Results reported in these examples are believed to be representative but do not constitute all the samples made involving the indicated ingredients.

Example 1

In this example, spandex is dry spun at six different speeds to illustrate the advantageous combination of properties that can be achieved in spandex spun at high speed from polyurethaneurea solutions in accordance with the invention. The particular polyurethaneurea employed in this example was PO4G(1800):M-

DI:EDA/PDA(90/10) made with a capping ratio of 1.75 that formed a capped glycol with an NCO content of 2.8% before being chain-extended with the diamine mixture.

The following general procedure was used to prepare the polymer and then dry spin it into filaments. PO4G 1800 number average molecular weight was mixed with MDI in a ratio of 1.75 moles of MDI per mole of PO4G (i.e., to provide a capping ratio of 1.75) and then reacted by heating the mixture for about 1½ hours at 90° C. to yield an isocyanate-terminated polyether (i.e., capped glycol) having an NCO content of 2.8 weight percent. The capped glycol was cooled and thoroughly mixed with DMAc for about 10 minutes to form a solution containing about 45 to 50% solids. Then, while the capped glycol solution was still being mixed, a mixture of diamine chain-extenders, consisting of 90 mole % EDA and 10 mole % PDA, and 7 mole % of diethylamine chain terminator (all mole % based on total moles of diamines present), the diamines and diethylamine being dissolved in additional DMAc, were added to the capped glycol solution. The additional amount of DMAc decreased the solids concentration of the resultant solution to about 35% by weight of the total solution and the the resulting reaction formed the desired segmented polyurethaneurea. The resulting polypolyurethaneurea solution had a viscosity of about 3000 poise at 40° C. and the polymer had an intrinsic viscosity of about 0.95 gram per deciliter (measured at 25° C. in DMAc at a concentration of 0.5 grams of polymer/100 ml of solution). Before dry-spinning the solution into filaments, the following conventional ingredients were added to the solution: (a) a copolymer of p-cresol and divinylbenzene amounting to 1.3%, (b) a polymer of bis(4-isocyanatocyclohexyl)methane and t-butyldiethanolamine amounting to 3.2%, and (c) silicone oil amounting to 0.15% (each percentage being by weight of the polymer in solution). The solution was then dry spun in conventional equipment through orifices to form 22-dtex, two-filament (11 dtex per filament) coalesced yarns. The filaments were pulled from the orifices by conventional puller rolls and wound up on cylindrical cores at different speeds.

The results of the tests are summarized in Table I, which lists the wind-up speed, break elongation, unload power, percent set and percent steam-set efficiency of each sample. Samples 1, 2 and 3 are of the invention. Samples A, B and C are comparison samples. Note the distinctly inferior unload power of the samples wound up at less than 500 m/min.

TABLE I

| Sample | Windup Speed m/min | E % | UP dN/tex | Set % | Steam-set Efficiency % |
|---|---|---|---|---|---|
| 1 | 853 | 497 | 0.150 | 31.6 | 24.1 |
| 2 | 734 | 526 | 0.155 | 30.3 | 26.2 |
| 3 | 570 | 552 | 0.141 | 29.5 | 27.6 |
| A | 478 | 577 | 0.128 | 31.0 | 28.3 |
| B | 393 | 548 | 0.108 | 28.0 | 30.4 |
| C | 137 | 616 | 0.082 | 29.0 | 34.8 |

Example 2

This example compares the properties of spandex made with PO4G(1800):MDI:EDA/PDA, in accordance with the procedures of Sample 2 of Example 1, with identical spandex comparison samples except that the EDA/PDA molar ratio was changed from 90/10 (Sample 2) to 85/15 (Sample 4) 75/25 (Sample D) and 65/35 (Sample E). The spandex of each sample was spun at 734 m/min. The properties of the resulting spandex, which are summarized in Table II, illustrate the advantages of the spandex of the invention prepared with an EDA/PDA molar ratio of 90/10 or 85/15 over spandex prepared with the EDA/PDA ratio outside the invention.

TABLE II

| Sample | Molar Ratio EDA/PDA | E % | UP dN/tex | Set % | Steam-set Efficiency % |
|---|---|---|---|---|---|
| 2 | 90/10 | 526 | 0.155 | 30.3 | 26.2 |
| 4 | 85/15 | 530 | 0.177 | 29.7 | 27.3 |
| D | 75/25 | 454 | 0.185 | 27.1 | 22.4 |
| E | 65/35 | 416 | 0.216 | 23.0 | 17.7 |

Example 3

In this example, five spandex samples (5, 6, 7, F and G)) were prepared by the general procedures used for preparing Sample 2 of Example 1, except that the number average molecular weight of the starting PO4G was 2200 (instead of 1800) and the capping ratio was 1.89 (instead of 1.75). In addition Samples F and 7 were prepared with an EDA/PDA molar ratio of 85/15 and Sample G, with the molar ratio of 75/25. Dry spun spandex Sample 5 and Comparison samples F and G were wound up at 734 m/min and Samples 6 and 7 were wound up at 570 m/min. The windup speeds and properties of the thusly produced spandex samples are summarized in Table III, below. Note that the spandex of Sample F, which was made with the higher molecular weight glycol and at the higher of the two windup speeds, had a steam set efficiency that was below the desired value of 24%. Note also that the spandex of Sample G, with its EDA/PDA ratio at 75/25, also had inadequate steam set efficiency. In contrast, the samples made in accordance with the invention (Samples 5–7) each possessed a very desirable combination of properties, and an especially advantageous heat set efficiency.

TABLE III

| Sample | Molar Ratio EDA/PDA | Windup Speed m/min | E % | UP dN/tex | Set % | Steam-set Efficiency % |
|---|---|---|---|---|---|---|
| 5 | 90/10 | 734 | 531 | 0.154 | 28.3 | 24.6 |
| 6 | 90/10 | 570 | 552 | 0.132 | 28.3 | 25.7 |
| F | 85/15 | 734 | 516 | 0.150 | 26.3 | 22.1 |
| 7 | 85/15 | 570 | 560 | 0.137 | 26.3 | 25.9 |
| G | 75/25 | 734 | 484 | 0.177 | 26.0 | 23.0 |

Example 4

This example compares properties of high-speed spun spandex of PO4G(1800):MDI:EDA/PDA(90/10), made by the the procedures for Sample 2 of Example 1, with spandex made by the same procedures except that the 90/10 EDA/PDA diamine mixture of Sample 2 was replaced by 90/10 mixtures of EDA/HOPD (Sample H) and EDA/HMPD (Sample I). Another comparison sample, a commercial 22-dtex, 3-filament coalesced spandex yarn, Sample J, was included. Sample J was made the same way as Sample 2, except that (a) the 90/10 diamine mixture was EDA/MPMD (instead of EDA/PDA), (b) the capping ratio was 1.7 (instead of 1.75), (c) the NCO content of the capped glycol intermediate was 2.40% (instead of 2.80%) and (d) the windup speed was 756 m/min (instead of 734 m/min). The properties of the resulting Spandex are summarized in Table IV, below, and clearly show the superiority of the EDA/PDA diamine coextender combination over the other combinations of diamine chain extenders. Diamine combinations other than the EDA/PDA mixture result in a high speed spun spandex that has less desirable properties of set and steam-set efficiency.

TABLE IV

| Sample | Diamine Mixture | E % | UP dN/tex | Set % | Steam-set Efficiency %. |
|---|---|---|---|---|---|
| 2 | EDA/PDA | 526 | 0.155 | 30.3 | 26.2 |
| H | EDA/HOPD | 485 | 0.177 | 24.0 | 21.2 |
| I | EDA/HMPD | 455 | 0.194 | 23.7 | 18.3 |
| J | EDA/MPMD | 480 | 0.141 | 22.8 | 17.1 |

Example 5

In this example, the advantage in women's hosiery is demonstrated for high speed spun spandex yarn made in accordance with the invention (Sample 2 of Example 1) as compared to high speed spun spandex yarn made with a very similar polymer that was outside the invention (comparison Sample K). Each spandex yarn was made of PO4G(1800):MDI:EDA/PDA in accordance with the procedure of Example 1 and was wound up at 743 m/min. The only difference between the two polymers was in the molar ratio of EDA to PDA. In sample 2, the ratio was 90/10 and in comparison sample K, the ratio was 75/25. The properties of the yarns were as follows.

TABLE V

| Sample | Molar Ratio EDA/PDA | E % | UP dN/tex | Set % | Steam-set Efficiency % |
|---|---|---|---|---|---|
| 2 | 90/10 | 526 | 0.155 | 30.3 | 26.2 |
| K | 75/25 | 470 | 0.185 | 27.8 | 21.7 |

Each of the spandex yarns was drafted three-fold and single covered with 1700 turns per meter on a conventional hollow spindle covering machine with a non-textured, 13-dtex, 7-filament 6-nylon yarn. The covered yarns were then knit into women's pantyhose by being knit in every other course on a conventional four-feed circular knitting hosiery machine operating at 700 rotations per minute, with the alternate courses being knit with a nontextured, 13-dtex, 3-filament 6-nylon yarn. After knitting, the hosiery was processed conventionally through cutting, sewing and dyeing steps. The final step in the fabrication was boarding, during which the legs of the hosiery were stretched onto forms and subjected to steam at 83 kiloPascals (12 psi) for about 15 seconds and then dried in air at 99° C. for about 1½ minutes.

After the boarding step, the hosiery was removed from the form and examined as follows. The hosiery was stretched about 10% circumferentially and viewed under a M420 stereomicroscope made by Wild division of Zeiss, Switzerland. The microscope was equipped with a fiber optic ring light illuminator to assist image analysis. A 10× magnification was employed. The image was transmitted to a Mackintosh IIfx microcomputer and analyzed with "IMAGE" softwear (a computer program developed by the U.S. National Institutes of Health and now in the public domain). "IMAGE" is basically a particle counter. As used here, the "particles" are loops or stitches in the stretched fabric, which appear on a screen as light spots. For each fabric, an area containing 240 stitches was analyzed by the software program to provide a calculated average "particle" (i.e., hole size) in pixels. A pixel is the smallest element of image individually processable in a video display system. Ten measurements were made for each hosiery fabric and the results averaged. The hosiery made with Sample 2 spandex (90/10 EDA/PDA) had an average of 560 pixels; the hosiery made with comparison Sample K spandex (75/25 EDA/PDA), 520 pixels. An increase in the number of pixels by 5% is considered to represent a very significant improvement in hosiery sheerness. Sample 2 hosiery had a pixel measurement that was nearly 8% greater than that of comparison sample K hosiery.

In addition to the sheerness measurement, the relative ability of the hosiery samples to retain the shape of the steam-setting boarding form was measured by comparing the the final lengths of the legs of the hosiery (from the top of the leg to the toe). The greater the length, the more the shape of the form is retained. The length of hosiery made with comparison sample K spandex was 39 cm and that made with sample 2 spandex was 42 cm. In this test, a 2.5-cm longer length is considered to represent a very large advantage in shape retention. These results demonstrate that hosiery made with spandex prepared in accordance with the invention is more sheer and retains its shape better than hosiery prepared with spandex that is outside the invention.

What is claimed is:

1. A process for dry spinning polyetherbased polyurethaneurea spandex, particularly suited for use in women's knitted hosiery, the process comprising
reacting methylene-bis(4-phenylisocyanate) with a poly(tetramethyleneether) glycol, at a capping ratio in the range of 1.65 to 1.95, the glycol having a number average molecular weight in the range of 1750 to 2250, to form a capped glycol having an isocyanate content in the range of 2.4 to 2.9%,
reacting, in an organic solvent, the capped glycol with a mixture of ethylenediamine and 1,2-diaminopropane chain extenders, the 1,2-diaminopropane amounting to in the range of 8 to 17 mole percent of the mixture of diamine chain extenders, to form a solution of a polyurethaneurea polymer, adjusting the concentration of the polymer in the organic solvent to be in the range of 32 to 38 weight percent of the total solution,
dry-spinning said solution to form filaments of textile decitex , and
winding up the resultant spandex at a speed of at least 550 m/min.

2. A process in accordance with claim 1 wherein the number average molecular weight of the poly(tetramethyleneether) glycol is in the range of 1800 to 2200 number average molecular weight to form isocyanate-capped glycol having a NCO content in the range of 2.75 to 2.85% and the 1,2-diaminopropane amounts to in the range of 10 to 15 mole percent of the mixture of diamine chain extenders.

3. A process in accordance with claim 2 wherein the thusly produced spandex has, in combination, a break elongation of at least 450%, an as-spun set in the range of 26 to 32% and a steam set efficiency in the range of 24 to 28%.

4. A process of claim 1, 2 or 3 wherein the winding speed is at least 700 m/min.

5. A process in accordance with claim 1, 2 or 3 wherein the winding speed is at least 850 m/min.

* * * * *